C. BRISTOW.
IMPLEMENT FOR SOWING GRAIN, SEED, MANURE, AND THE LIKE.
APPLICATION FILED JAN. 12, 1916.
1,331,235.
Patented Feb. 17, 1920.
2 SHEETS—SHEET 1.
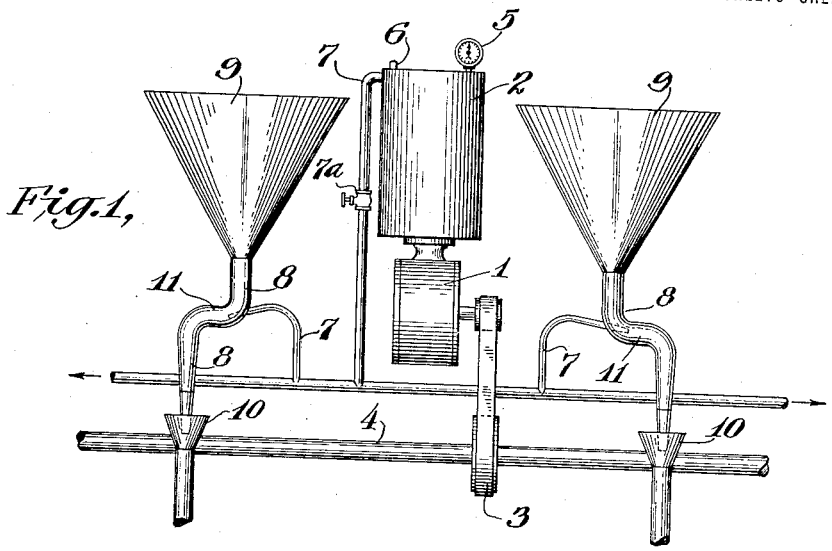
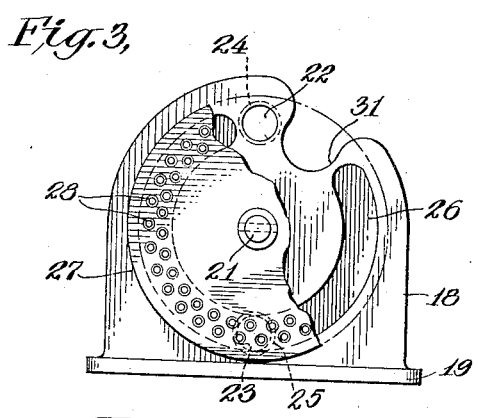
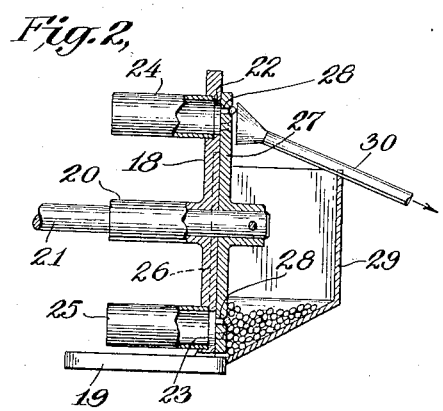
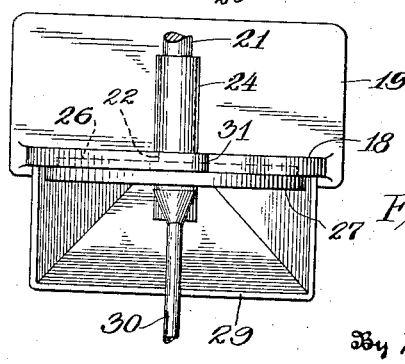
Inventor
Charles Bristow
By his Attorney
Wm Wallace White

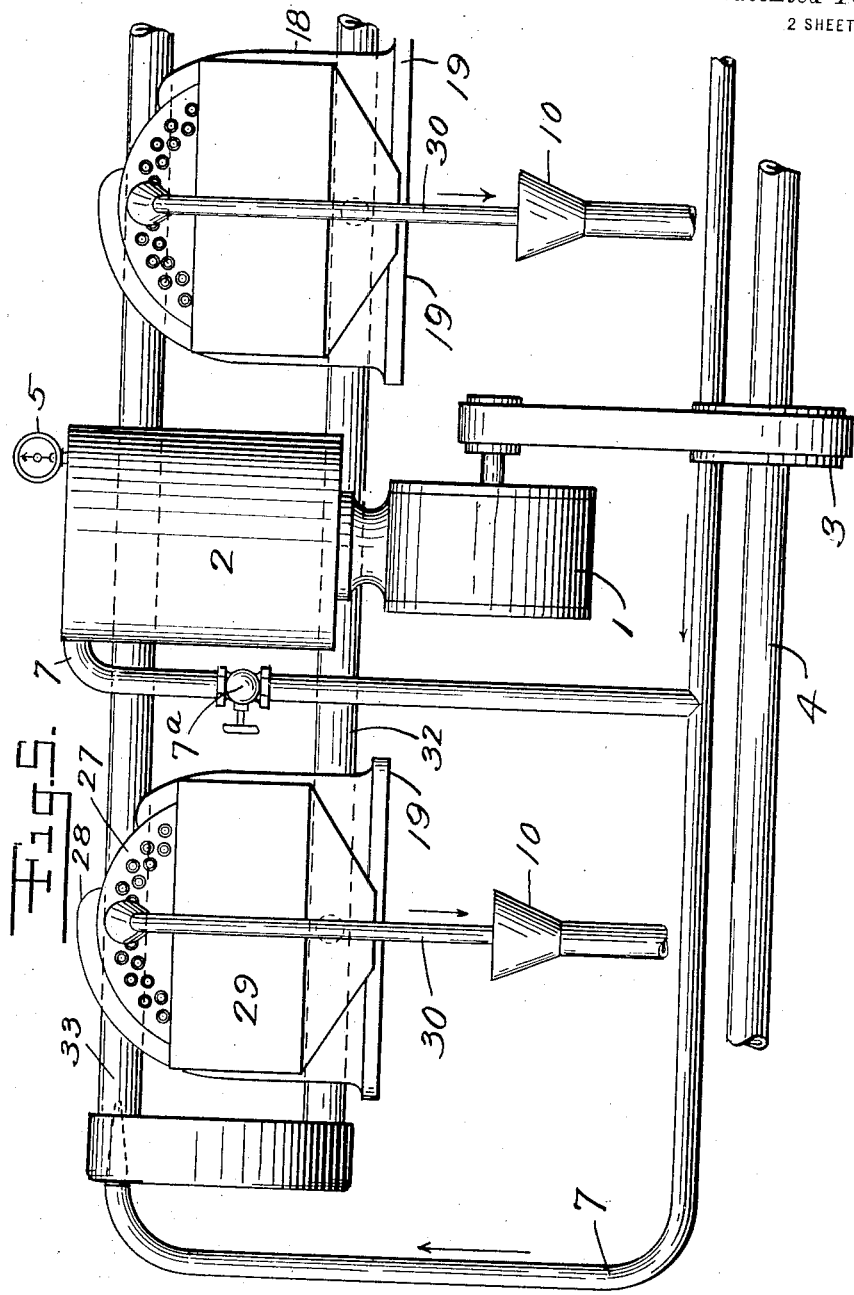

UNITED STATES PATENT OFFICE.

CHARLES BRISTOW, OF FENDALTON, CHRISTCHURCH, NEW ZEALAND.

IMPLEMENT FOR SOWING GRAIN, SEED, MANURE, AND THE LIKE.

1,331,235.	Specification of Letters Patent.	Patented Feb. 17, 1920.

Application filed January 12, 1916. Serial No. 71,662.

*To all whom it may concern:*

Be it known that I, CHARLES BRISTOW, a subject of the King of Great Britain, residing at 19 Stratford street, Fendalton, Christchurch, in the Dominion of New Zealand, have invented new and useful Improvements in and Relating to Implements for Sowing Grain, Seed, Manure, and the like, of which the following is a specification.

This invention relates to drills, broadcasters and other implements for sowing grain, seed, manure and the like upon the land and refers more particularly to the means for feeding such material from the hopper or receptacle in which it is contained upon the implement, into the colters or directly to the land in the required predetermined proportions.

Hitherto this feeding has been performed by mechanical means actuated by the rotation of the carrying wheels. In practice however such mechanical means have proved unsatisfactory inasmuch as they have involved the employment of a large number of intricate working parts requiring careful attention to maintain them in proper working order and seriously increasing the draft of the implement. In addition to these objections also there is always a tendency on the part of a mechanical feeding device to bruise or break a certain amount of the seed and so destroy the germinating power of the latter.

It is the object of the present invention therefore to provide a substitute for the said mechanical feeding device, thus dispensing with the more complicated portions of the implement and eliminating the danger of damage to the seed, while at the same time effecting a material reduction in the draft.

In carrying this object into effect the present invention consists essentially of the provision upon an implement for this purpose, of pneumatic means for feeding grain, seed, manure and the like from a hopper or hoppers to the colters, or in the case of a broadcaster, to the land, and the invention includes also suitable means of adjustment whereby the said feed may be regulated for the purpose of causing such material to be sown in any desired quantity or proportion to the acreage.

The term "pneumatic" appearing in this specification and the claims relating thereto, is to be understood as covering not only the use of compressed air, but also the employment of a partial vacuum or a combination of both compressed air and vacuum, while in its application the pneumatic agency, in any of such forms, may be arranged to operate, either directly upon the said material, or indirectly by induction, that is to say, by producing a primary effect which will give rise to a secondary or inductive action upon the material. The present invention therefore includes within its scope each and all of such forms and methods of applying some pneumatic agency for this purpose.

In order that the nature of the invention may be fully understood, reference will now be made to the accompanying drawings showing by way of example, some representative methods of its practical application and in which:—

Figure 1 is a diagrammatic view showing a typical installation upon an implement.

Fig. 2 is a fragmentary view showing in side elevation and partly in section a rotary feeding device.

Fig. 3 is a view showing in front elevation the feeding device shown in Fig. 2, the hopper and discharge pipe being omitted.

Fig. 4 is a view showing in top plan the device shown in Figs. 2 and 3.

Fig. 5 is a fragmentary side elevation illustrating the rotary feeding device shown in Figs. 2, 3 and 4 installed in the place of the feeding device shown in Fig. 1.

With reference to Fig. 1, the installation upon the implement comprises an air-compressor or vacuum-pump 1 in communication with a suitable reservoir or reservoirs 2 adapted to contain compressed air or to be under vacuum from such pump as the case may be.

The said pump 1, which may be of the rotary type, as here shown, reciprocating type, or consist of bellows or other suitable appliances, is operated as by means of suitable gearing 3 from the carrying-wheels, as by means of the shaft or live-axle 4.

The air or vacuum-chamber 2 is preferably provided with a gage 5 for the purpose of showing the pressure or degree of vacuum therein and such chamber is preferably provided also with a relief-valve 6 capable of adjustment for the purpose of regulating the pressure.

Connected with the chamber 2 also is a pipe 7 communicating with the several feeding devices. As here shown these devices consist of cranked spouts 8 communicating with the hoppers 9, for conveying the grain seed or other material, to the grain tubes 10 of the colters. By this arrangement the pneumatic agency is introduced into the horizontal, or approximately horizontal portions 11 of the spouts 8 and has the effect of causing the material to flow from the hoppers 9 to the tube 10.

The quantities of the material sown may be regulated by varying the areas of the spouts 8 or any portions of such, or again the quantity of material sown by the implement as a whole may be regulated by adjusting the relief-valve 6 to give the desired air-pressure.

In order to enable the supply of compressed air to be cut-off from the feeding devices when required or to permit of the flow being conveniently regulated, a suitable cock or valve 7ª may be inserted in the pipe 7.

Referring now to the feeding device illustrated in Figs. 2, 3, 4, and 5, 18 is a stationary plate adapted to be mounted permanently upon the implement, as by means of its base 19. At or about the center of the plate 18, is provided a bearing 20 within which is mounted a spindle 21 adapted to be revolved by any suitable gearing (not shown) either from the shaft 4 or other means actuated by the carrying wheels of the implement. Formed through the said plate 18 at points equidistant from the center of the spindle 21, are two openings or holes 22 and 23 with which are connected respectively two rearwardly projecting tubes 24 and 25.

The opening 22, which is positioned in the upper portion of the plate above the spindle, terminates in a plain port in the face of such plate, while the other opening 23 communicates with an annular opening or recess 26 formed in the front face of the plate at a radius coinciding with that of the holes 22 and 23. The said groove 26 extends around the lower portion of the plate and terminates on either side of port 22.

Keyed upon the spindle 21 is a disk 27 adapted to fit virtually air-tight with the face of the plate 18. Formed through the disk, at a radius from the center of the spindle 21 coinciding with that of the opening 26 and ports 22 and 23, are a series of holes or perforations 28 of suitable size to permit of the seed lodging against their orifices upon the outer or front face of the plate without any tendency to enter such holes and so become jammed.

Arranged in front of the lower portion of the disk 27 is a suitable hopper or receptacle 29 adapted to contain seed in contact with the said disk, such hopper being either a main hopper of the implement or a subsidiary hopper supplied with seed by gravity or otherwise from such main hopper.

Arranged above the said hopper 29 is a chute 30 having an orifice at its upper end adjacent to the port 22 such chute extending therefrom in a downwardly inclined direction and adapted to be connected at its lower end with the grain-tube of a colter or other means for delivering the seed to the land.

By connecting the tube 25 with the suction inlet of the blower by means of a tube 32 and the tube 24 by means of a connecting tube 33 with the discharge tube 7 of compressed air, it will be understood that, as the disk 27 is revolved, the action of the suction will cause each of the perforations 28 in passing through the hopper 29, to draw a seed against its orifice and in which condition such seeds will remain while the said perforations are in communication with the opening 26. In the course of the said revolution however each of the perforations 28 will pass clear of the end of the opening and come into register with the port 22, whereupon an air pressure will be substituted for the suction and in consequence the seeds will at this point be blown from their seatings upon the perforations and will be received by the chute 30 by means of which they are directed to the grain tube of the colters or other sowing means. The discharge tube 7 is shown in Fig. 5 connected to the tube 33 only at one end of the latter, the opposite ends of both the tubes 7 and 33 being broken away.

By this arrangement it will be seen therefore that a certain predetermined number of seeds are discharged at each revolution of the disk, according to the number of perforations provided, and further, that, by providing the perforations of the required diameter the appliance may be employed for feeding grain, seed, peas or any other material of the kind in this manner.

In order to permit of the escape of any dust that may collect between the faces of the disk 27 and plate 18, the latter is preferably provided with a notch or opening 31 positioned between the port 22 and the commencement of the groove 26, as shown in Fig. 3.

It will be understood that in the case of implements such for instance as broadcasters, the seed or material delivered by the feeding devices instead of entering the colters, will be distributed upon the land by any suitable means.

As previously mentioned however the construction above described is given merely by way of illustrating methods of carrying into practical effect the invention which consists of the employment of pneumatic means for providing the required feed for the material to be sown.

I claim:

1. In an implement for sowing seed, manure and the like, in combination, an air compressor, a suction device operatively associated therewith, a plate having an incomplete annular groove in communication with the suction device and an opening in said plate intermediate the ends of said groove, said opening being in communication with the compressor discharge, a revoluble disk having perforations each adapted to receive a single seed, said perforations being arranged in a circle to correspond with the said annular groove, and means to rotate said disk and to operate the air compressor.

2. In an implement for sowing seed, manure and the like, in combination, an air compressor, a suction device operatively associated therewith, a plate having an incomplete annular groove in communication with the suction device, an opening in said plate intermediate the ends of said groove and a notch between said opening and one end of said groove, said opening being in communication with the compressor discharge, a revoluble disk having perforations each adapted to receive a single seed, said perforations being arranged in a circle to correspond with the said annular groove, and means to rotate said disk and to operate the air compressor.

In testimony whereof I have signed my name to this specification in the presence of two subscribing witnesses.

CHARLES BRISTOW.

Witnesses:
   CYRIL CARLYN COAHES,
   ANN EMILY GREER.